(12) United States Patent
Myrstad et al.

(10) Patent No.: US 6,497,811 B1
(45) Date of Patent: Dec. 24, 2002

(54) REDUCTION OF SULPHUR CONTENT IN FCC-NAPHTHA

(75) Inventors: Trond Myrstad, Trondheim (NO); Bente Boe, Trondheim (NO); Erling Rytter, Trondheim (NO); Hege Engan, Trondheim (NO); Avelino Corma, Valencia (ES); Fernando Rey, Grisolia (ES)

(73) Assignee: Den Norske Stat Oljeselskap A.S., Stavanger (NO)

( * ) Notice: Subject to any disclaimer, the term of this patent is extended or adjusted under 35 U.S.C. 154(b) by 0 days.

(21) Appl. No.: 09/661,053

(22) Filed: Sep. 13, 2000

Related U.S. Application Data (63) Continuation-in-part of application No. PCT/NO99/00087, filed on Mar. 12, 1999.

(30) Foreign Application Priority Data

Mar. 13, 1998 (NO) ................................................ 981143

(51) Int. Cl.⁷ ........................... C10G 11/00; B01J 23/00
(52) U.S. Cl. .............. 208/113; 208/208 R; 208/120.01; 208/120.05; 208/120.25; 208/120.35; 502/300; 502/340; 502/341
(58) Field of Search ............................ 208/113, 208 R, 208/120.01, 120.25, 120.05, 120.35; 502/300, 340, 341

(56) References Cited

U.S. PATENT DOCUMENTS

| | | | |
|---|---|---|---|
| 4,902,660 A | | 2/1990 | Delzer et al. ................ 502/174 |
| 5,245,096 A | * | 9/1993 | Derouane et al. ............ 585/419 |
| 5,441,630 A | | 8/1995 | Dai et al. .............. 208/216 PP |
| 5,459,118 A | * | 10/1995 | Dai et al. .................... 502/300 |
| 5,928,496 A | * | 7/1999 | Albers et al. ................ 208/113 |
| 5,951,851 A | * | 9/1999 | Poirier et al. ............. 208/213 |
| 6,010,619 A | * | 1/2000 | Wise et al. ............ 208/120.01 |
| 6,027,636 A | * | 2/2000 | Poirier ........................ 208/213 |
| 6,103,106 A | * | 8/2000 | McVicker et al. .......... 208/213 |
| 6,221,240 B1 | * | 4/2001 | Klein et al. ................. 208/213 |
| 6,245,221 B1 | * | 6/2001 | Baird, Jr. et al. ........... 208/213 |

FOREIGN PATENT DOCUMENTS

| | | |
|---|---|---|
| EP | 0 609 971 | 8/1994 |
| NO | 301324 | 10/1997 |
| WO | 97/48480 | 12/1997 |

* cited by examiner

*Primary Examiner*—Walter D. Griffin
(74) *Attorney, Agent, or Firm*—Wenderoth, Lind & Ponack, L.L.P.

(57) ABSTRACT

The present invention comprises a composition for reducing the sulphur content in a hydrocarbon composition, wherein the composition comprises a hydrotalcite material, which has been impregnated with a Lewis acid, and optionally a FCC-catalyst. The hydrotalcite material impregnated with the Lewis acid has been added as a separate component, or incorporated in the matrix of the FCC-catalyst. The Lewis acid is selected from the group comprising elements and compounds of the transition metals, and preferably Zn, Cu, Ni, Co, Fe and Mn, most preferably Zn. Further, the Lewis acid may also be selected from the group comprising elements and compounds of the lanthanides and actinides. The present invention also comprises a method for reducing the sulphur content in a hydrocarbon composition. A method for reducing the sulphur content in a hydrocarbon composition, which is to be cracked, is also described. Further, the use of a composition comprising a hydrotalcite material, which has been impregnated with a Lewis acid and optionally, mixed with a FCC-catalyst, is also included.

15 Claims, 6 Drawing Sheets

REDUCTION OF SULPHUR CONTENT IN FCC-NAPHTHA

This is a CIP of PCT/NO99/00087, filed Mar. 12, 1999.

The present invention comprises a composition and a method for reduction of the content of organically bound sulphur in a hydrocarbon composition in a cracking process. The invention also comprises a method for using a composition for reducing the sulphur content in a hydrocarbon composition.

BACKGROUND OF THE INVENTION

Legislation regarding environmental aspects sets a limit for the sulphur content in petrol. Petrol is a direct contributor to $SO_x$-effluents, and is also poisoning car catalysts at low temperatures (low temperature activity). The main sulphur contributor in petrol is FCC-naphtha (fluid catalytic cracking-naphtha), and efforts to obtain an effective reduction of the sulphur content must therefore be based on said petrol component.

It is also known to reduce the sulphur content in FCC-naphtha by hydrogenation of a flow of FCC-feed or of FCC-naphtha. Both methods require high investment costs and are expensive to operate. A third method for reducing the sulphur content in FCC-naphtha is to lower the end boiling point of FCC-naphtha since the main part of the sulphur component in FCC-naphtha exist in the heavy fraction. A disadvantage concerning the latter method is that some of the components in FCC-naphtha having highest octane number are also present in the heavy fraction. A lowering of the end boiling point will also reduce the octane number in addition to reducing the yield of naphtha.

WO-86/06090 describes a method for oxidation of $SO_2$ into $SO_3$ wherein a hydrocarbon composition is contacted with a material existing of a spinel composition including an alkaline earth metal, an aluminium component and one or several metals, including zinc. Reducing the sulphur content in FCC-naphtha is not mentioned in WO-86/06090.

From WO-87/06157 is it further known a composition comprising a spinel, preferably a magnesium-aluminium-containing spinel, which has been impregnated with one or several metals to promote oxidation of $SO_2$ to $SO_3$. The metals are preferably selected from the group consisting of IB, IIB and/or the group of platinum metals.

WO 98/48480 describes a process for sulphur oxide sorption using hydrotalcite materials as contact solids. Large crystalline sheet materials having increased sorption of SOX are provided by incorporation of certain organic acid anionic species to modify the hydrotalcite/brucite structure. WO97/48480 does not describes elimination of sulphur as such but elimination of $SO_2$. Eliminating sulphur and eliminating $S_2$ from hydrocarbons are two completely different chemical processes.

Prior art mentioned above comprises compositions for oxidation of $SO_2$ into $SO_3$ in the regenerator of a catalytic cracker. Regarding this process, it is not desirable with $SO_x$-effluents from environmental aspects, and effluents of sulphur made of $H_2S$ is more convenient for most refineries, wherein $H_2S$ is converted into elementary sulphur. A composition for reducing $SO_x$-effluents, in most cases a metal oxide (MO), possesses the following effect:

oxidizing $SO_2$ into $SO_3$ in the 2 $SO_2+O_2=2SO_3$ regenerator reacting with $SO_3$ and create a metal $SO_3+MO=MSO_4$ sulphate submit sulphur as $H_2S$ in the cracker, $MSO_4+4H_2=MO+H_2S+3H_2O$ and create the oxide state of the metal The prior art mentioned above does not refer to reduction of the sulphur content in a hydrocarbon composition or in FCC-naphtha as in the present invention. Reduction of the sulphur content in a hydrocarbon composition or in a hydrocarbon composition which is cracked, is obtained according to the composition of the present invention, and described according to the following reaction:

$$RS+H_2=R+H_2S$$

According to the above mentioned, the chemistry concerning the reduction of the $SO_x$-effluent and the reduction of the sulphur content in FCC-naphtha is different. A composition, which reduces $SO_x$-effluent, can not be expected to reduce the sulphur content in a hydrocarbon composition or in a hydrocarbon composition which is cracked catalytic.

A composition and method for reducing the sulphur content in FCC-naphtha, which uses a special catalyst or composition, added a known FCC-catalyst comprising a zeolite and a matrix, is known. A catalyst or composition as such which reduces the sulphur content in FCC-naphtha, is described by Wormsbecher et al. in EP-A1-609971, wherein a composition comprises a Lewis acid deposited on an aluminium oxide carrier. EP-A1-609971 also describes that the Lewis acid may comprise components and compounds including Zn, Cu, Ni, Ag, Cd, Lu, Su, Hg, Tl, Pb, Bi, B, Al and Ga deposited at aluminium oxide. The above mentioned patent application also refer to compositions which comprises aluminium oxide and spinel which may be added to catalytic cracking catalysts to reduce the $SO_x$-effluent during oxidation and regeneration of the FCC-catalyst. So far, the industry has not developed compositions comprising catalytic splitting catalysts for reducing the sulphur content in products as petrol and diesel.

EP 798362, Ziebarth et. al describes $TiO_2$-containing compositions which reduce the sulphur content of the product flow from a catalytic cracking-catalyst. The present invention comprises a composition for reducing the sulphur content of a hydrocarbon composition and of a catalytic cracked hydrocarbon composition wherein the composition comprises a carrier made of a hydrotalcite material, different from i.a. Wormsbecher et al and Ziebarth et al.

BRIEF SUMMARY OF THE INVENTION

The present invention provides a composition for reducing the sulphur content in a hydrocarbon composition wherein said composition comprises a hydrotalcite material which is impregnated with a Lewis acid, and optionally an FCC-catalyst. The hydrotalcite material impregnated with the Lewis acid is added as a separate component, or incorporated in the matrix of the FCC-catalyst. Said Lewis acid is selected from the group comprising elements and compounds of the transition metals, preferably Zn, Cu, Ni, Co, Fe and Mn, most preferably Zn. The Lewis acid is also selected from the group comprising elements and compounds of the lanthanides or the actinides. Preferably, the composition of the present invention is promoted with a hydrogen transfer promoter, preferably made of Pt.

Further, the present invention provides a method for reduction of the content of organically bound sulphur in a hydrocarbon composition in a cracking process, wherein said composition is contacted with a composition promoted with a hydrogen transfer promotor, comprising a hydrotalcite material impregnated with a Lewis acid and a FCC-catalyst. Said Lewis acid is selected from the group comprising elements and compounds of the transition metals, preferably Zn, Cu, Ni, Co, Fe and Mn, most preferably Zn. The Lewis acid is also selected from the group comprising elements and compounds of the lanthanides and the actinides. Said hydrotalcite material is preferably promoted with a hydrogen transfer promoter, preferably made of Pt. According to the method for reducing the sulphur content in a hydrocarbon composition in a cracking process, said hydrotalcite material impregnated with the Lewis acid is added as a separate component, or has been incorporated in the matrix of the FCC-catalyst. The hydrocarbon composition comprises FCC-naphtha, LCO and/or HCO-fractions. Further, the use of a composition comprising a hydrotalcite material, which has been impregnated with a Lewis acid, and optionally mixed with an FCC-catalyst for reducing the sulphur content in a hydrocarbon composition, is also disclosed. The Lewis acid is selected from group comprising elements and compounds of the transition metals, and preferably Zn, Cu, Ni, Co, Fe and Mn, most preferably Zn. Further, said Lewis acid is selected from the group comprising elements and compounds of the lanthanides and the actinides. It is preferred using a composition promoted with a hydrogen transfer promoter, preferably made of Pt. Use according to the present invention is preferably a hydrocarbon composition which is a cracked hydrocarbon composition made of FCC-naphtha. Further on, use of a hydrotalcite material impregnated with a Lewis acid is encompassed, in which said hydrotalcite material has been added as a separate component, or has been incorporated in the matrix of the FCC-catalyst.

BRIEF DESCRIPTION OF THE DRAWINGS

FIGS. 1–6 describe the following effects of the present invention:

DETAILED DESCRIPTION OF THE INVENTION

Several compositions, mainly metals impregnated on different kinds of carriers than aluminum oxide, are tested. Said carriers comprise e.g. silicon oxide, titanium oxide and zirconium oxide. According to the present invention, said Lewis acid impregnated hydrotalcite material is found to reduce the sulphur content in a hydrocarbon composition considerably, primarily in a hydrocarbon composition, which is to be FCC cracked. The process for preparing said hydrotalcite material, henceforth referred to as Mg (Al)O, is described in WO 94/29021 which is incorporated by reference. The hydrotalcite material possesses a particular high stability during steaming/steam treatment at high temperatures, and may be used as a carrier in catalytic processes. Cavani, F., et al, Catalysis Today, 11 (1991) 173, describes hydrotalcite and hydrotalcite like materials which are minerals or chemical components which can be expressed according to the following formula:

$$[M^{2+}(1-x)M^{3+}{}_x(OH)_2]^{x+}(A_{x/n}{}^{n-}).mH_2O$$

where x, which generally is between 0.1 and 0.5, $M^{2+}$, is a divalent metal ion ($Mg^{2+}$), $M^{3+}$ a trivalent metal ion ($Al^{3+}$), while $A^{n-}$ is one or several anions as e.g. carbonate or borate. A typical hydrotalcite is as follows:

$$[Mg_6Al_2(OH)_{16}]CO_3.4H_2O$$

which also represent the natural occurring hydrotalcite mineral. The proportion may be varied according to the ratio between Mg and Al, wherein both the metals may be replaced by other di- or tri-valent metals, and carbonate has been be replaced by other anions. Calcination of $[Mg_3Al(OH)_8]CO_3.xH_2O$ at temperatures in the range of from 400–1000° C. makes a mixed oxide, expressed as Mg(Al)O. Mg(Al)O consists substantially of a MgO structure where some of the Mg-atoms are replaced by Al. Calcination increase the surface by a size of from 45 $m^2/g$ close up to 200 $m^2/g$. The surface is also highly hydrothermal stable, and is reduced little by steaming.

Hydrotalcite material itself does not possess enough capacity to reduce sulphur, and impregnation is therefore required. It is observed that impregnation of a hydrotalcite material with a Lewis acid is reducing the sulphur content in a hydrocarbon composition and in a hydrocarbon composition, which shall be FCC cracked. The Lewis acid may contain components with several metals. It is most preferable to use a Lewis acid including compounds of zinc for reducing the sulphur content in FCC-naphtha. The accessibility of hydrogen is important when reducing the sulphur content in FCC-naphtha since the sulphur is removed in the form of $H_2S$. It is observed that addition of a hydrogen transfer promoter to a sulphur reducing composition of the present invention, increases the accessibility of hydrogen, which thereafter is reducing the sulphur content. Hydrogen transfer promoters of the group of the platinum metals are preferred, preferably platinum (Pt). It is observed that said composition also is reducing the sulphur content in LCO (light cycle oil) and HCO ( heavy cycle oil) from a catalytic cracker.

The catalytic cracking is occurring in conventional FCC-units, more precisely comprising a reactor and a regenerator, where the reaction temperature is in the range of from 400–700° C., and the regenerating temperature is in the range of from 500–850° C. The FCC-catalyst is circulating in FCC-units in a continuous reacting/regenerating process. The hydrocarbon composition, which is to be added to the FCC-unity, comprises gas oils and other heavy hydrocarbons with boiling point from about 300° C. and higher. Said gas oils and other heavy hydrocarbons possess generally a sulphur content in the range from 0.1–2.5 weight percentage.

The FCC-catalyst is preferably made of powder, and generally possesses an average particle size in the range of from 50–100 μm, and a bulk density in the range of from 0.4–0.9 kg/l. If the composition described in the present invention is made of powder and further is mixed mechanically with the FCC-catalyst, it is preferred that the particle size, the density and mechanical strength of said composition and said FCC-catalyst have the same size.

Figure 1:
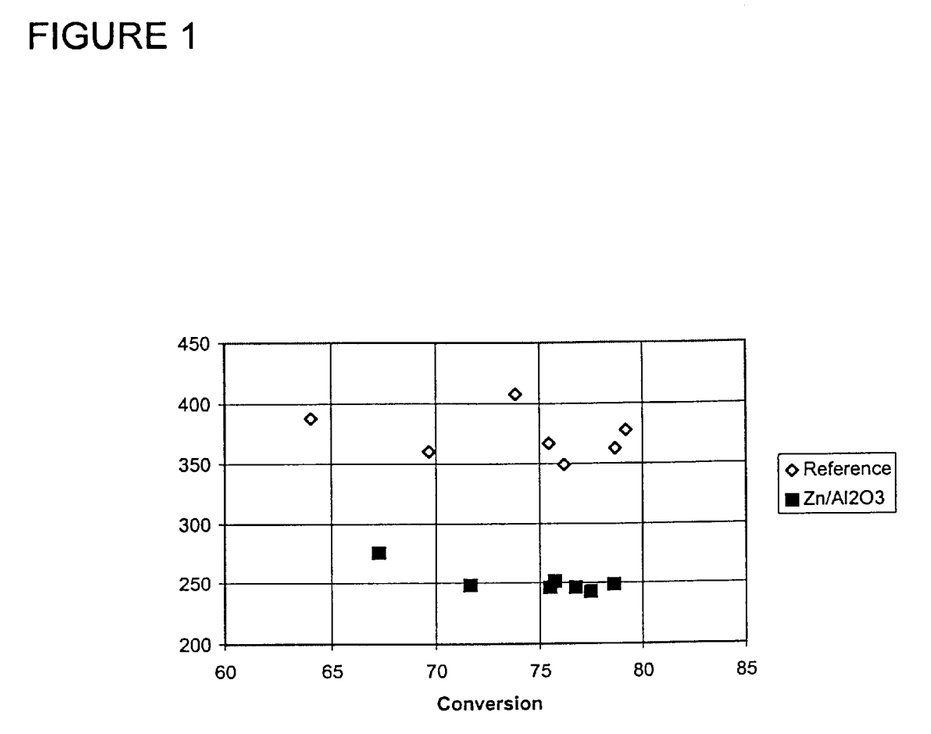
FIG. 1: Effect of $Zn/Al_2O_3$ on the sulphur content in FCC-naphtha.

The present invention comprises a new composition for reducing the sulphur content in a hydrocarbon composition and in a catalytic cracked hydrocarbon composition. The efficiency of this new composition is given in the following examples. Example 1 indicates a composition described by Wormsbecher et al., EP 609971-A1, zinc on aluminum oxide ($Al_2O_3$). This composition described in EP 609971 was made as a comparative example, and reduction of the sulphur content is shown in FIG. 1.

Figure 2:
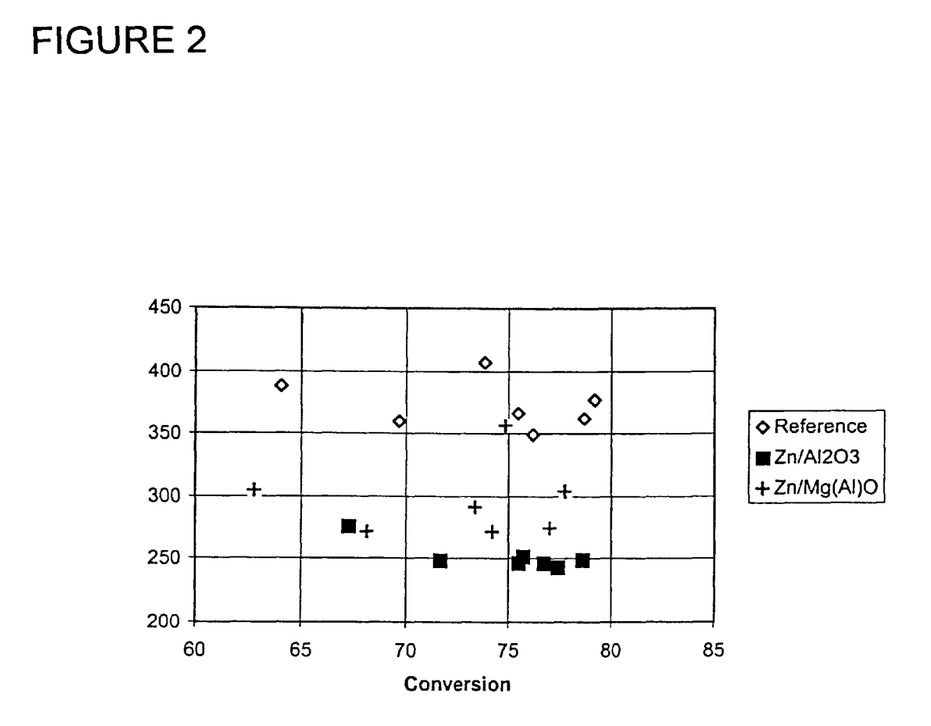
FIG. 2: Effect of $Zn/Mg(Al)O$ on the sulphur content in FCC-naphtha.

Example 2 describes a composition based on zinc impregnated with said hydrotalcite material, and in FIG. 2 a hydrotalcite material is compared with prior art (Zn/Al$_2$O$_3$).

Example 3 shows that a hydrotalcite material itself does not possess an effect reducing the sulphur content in FCC-naphtha.

Example 4 shows the effect of a composition which is promoted for reducing the sulphur content (Pt promoted on a Zn/Mg(Al)O— composition).

Naphtha, which is to be created by catalytic cracking, contains different sulphur containing components, e.g. mercaptans, thiophenes, thiophenols and benzothiophenes. The composition of the present invention possesses different reducing effect on the sulphur containing components, which are created. Sulphur reduction is most effective for mercaptans, but also the content of thiophenes and thiophenols is reduced, as indicated in detail in Example 5, Tables 1 and 2.

Figure 5:
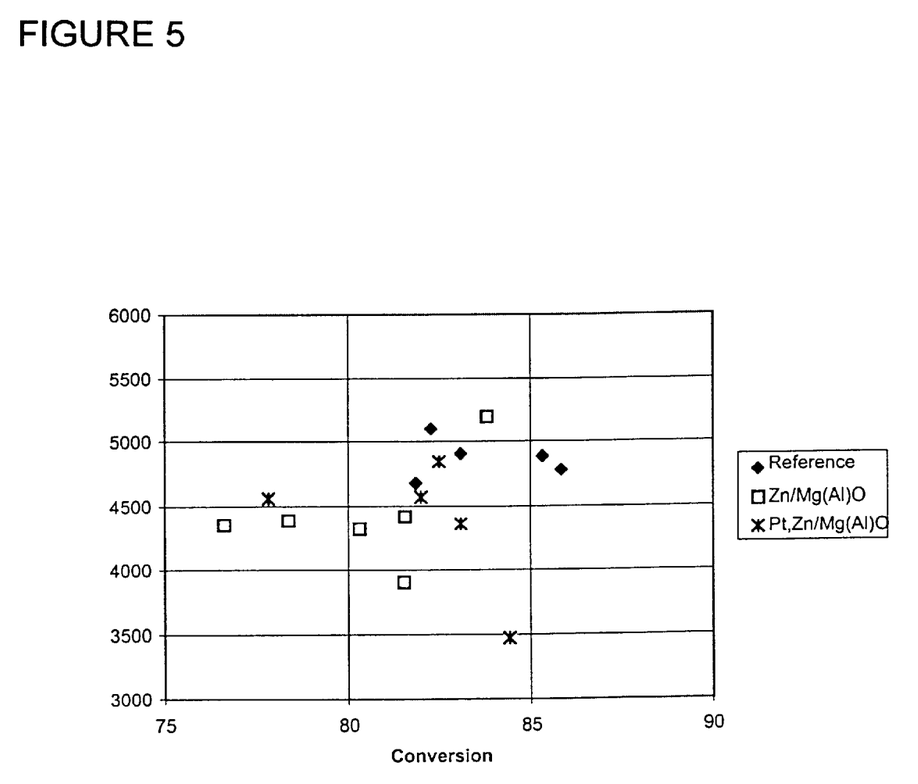
FIG. 5: Effect of $Zn/Mg(Al)O$ and $Pt/Zn/Mg(Al)O$ on the sulphur content in LCO.
Figure 6:
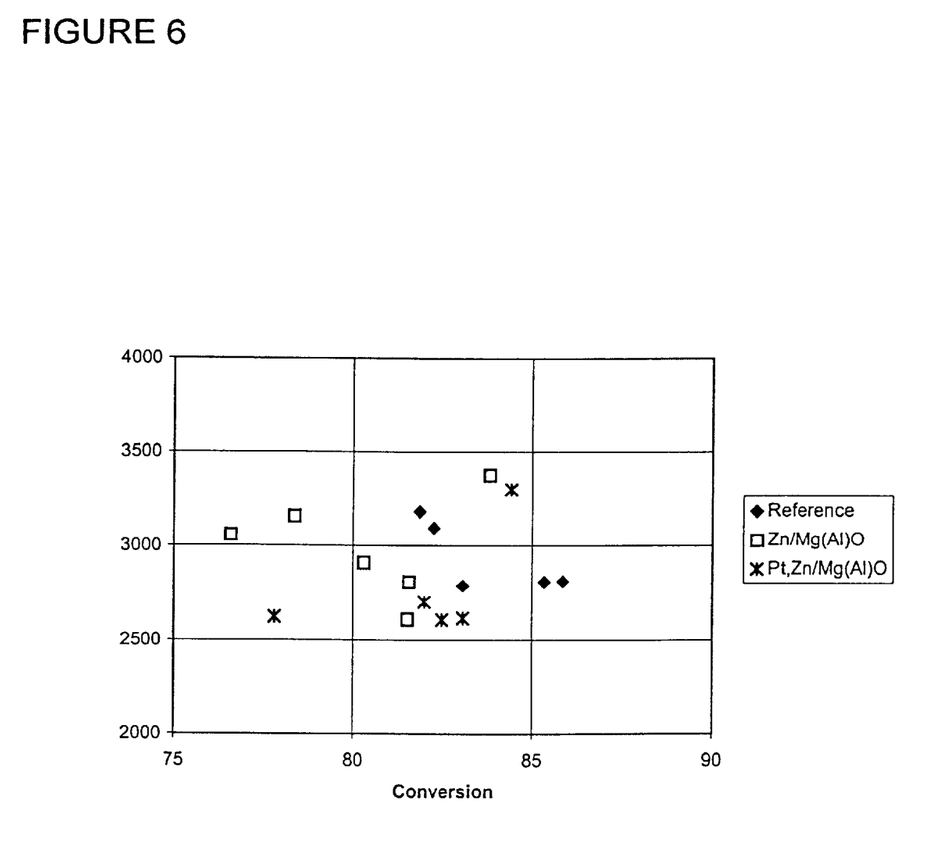
FIG. 6: Effect of $Zn/Mg(Al)O$ and $Pt/Zn/Mg(Al)O$ on the sulphur content in HCO.

In Example 6, an analysis of the sulphur content in the LCO- and the HCO-fractions is performed. The results are shown in FIGS. 5 and 6.

EXAMPLE 1

A composition of Zn/Al$_2$O$_3$ was prepared by impregnating 10 wt % zinc on γ-Al$_2$O$_3$ by incipient wetness method. A commercially available FCC catalyst was divided in two parts. One of the parts was mixed with 10 wt % of the Zn/Al$_2$O$_3$-composition. Both of the samples were tested by MAT (Micro Activity Test) at the following conditions:
Reacting temperature: 510° C.
Injection time: 30 s
Feed: Atmospheric distillation residues from the North Sea The sulphur content of the naphtha fraction in the experiments was set at AED (Atomic Emission Detector), and the results are given in FIG. 1. The catalyst test which was mixed with 10 wt % of the Zn/Al$_2$O$_3$ composition, gave a reduction of the sulphur content in the FCC-naphtha fraction in the range of 15% compared to the reference test. The reference test or the reference catalyst is a FCC-catalyst without interference of other components or compositions.

EXAMPLE 2

A composition was prepared by impregnating 10 wt % zinc at Mg(Al)O by incipient wetness method. 10 wt % of the composition was mixed with the same commercial catalyst of Example 1, and tested by MAT (Micro Activity Test) at the same conditions as given in Example 1.

FIG. 2 gives the results from this test (Example 2) compared with the results from Example 1 (Zn/Al$_2$O$_3$). It is given in the Figure that the new composition of Zn/Mg(Al)O possesses the same reducing capacity of sulphur as Zn/Al$_2$O$_3$.

EXAMPLE 3

10 wt % of the hydrotalcite material was mixed with a commercial catalyst, and tested in MAT at the conditions given in Examples 1 and 2.

Figure 3:
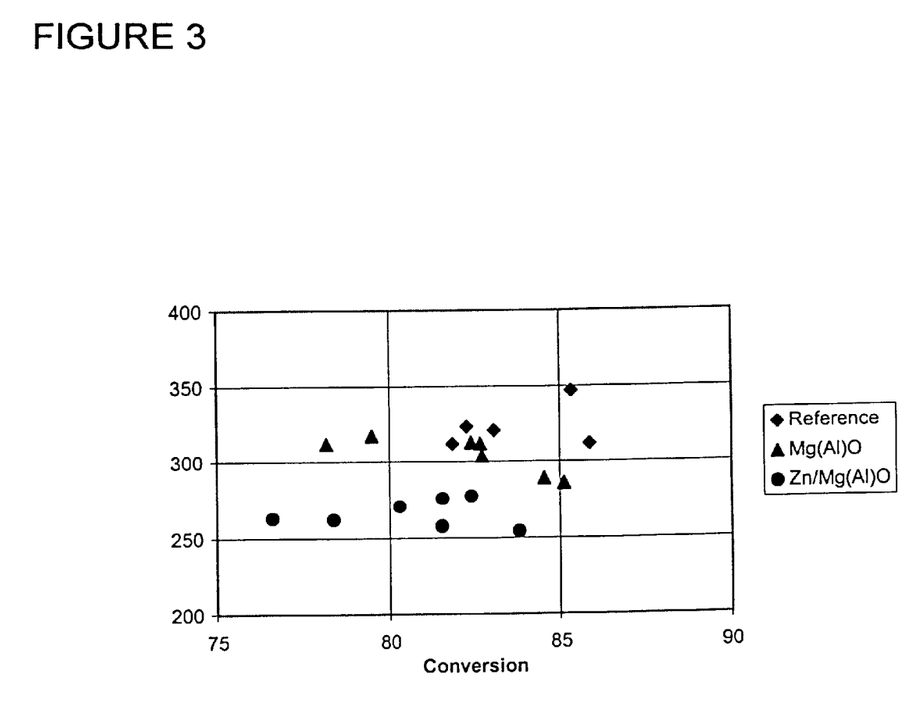
FIG. 3: Effect of $Mg(Al)O$ on the sulphur content in FCC-naphtha.

FIG. 3 gives the results from this test compared to Zn/Mg/(Al)O prepared according to Example 2, and with the reference test. It appears from the Figure that the hydrotalcite material does not possess significant effect on the sulphur content in FCC-naphtha without addition of a metal.

EXAMPLE 4

0.3 wt % Pt was added to the Zn/Mg/(Al)O-composition described in Example 2, by promoting platinum at the composition by incipient wetness method. 10 wt % of the Pt-promoted composition was mixed with the same commercial FCC-catalyst as given in Example 3.

Figure 4:
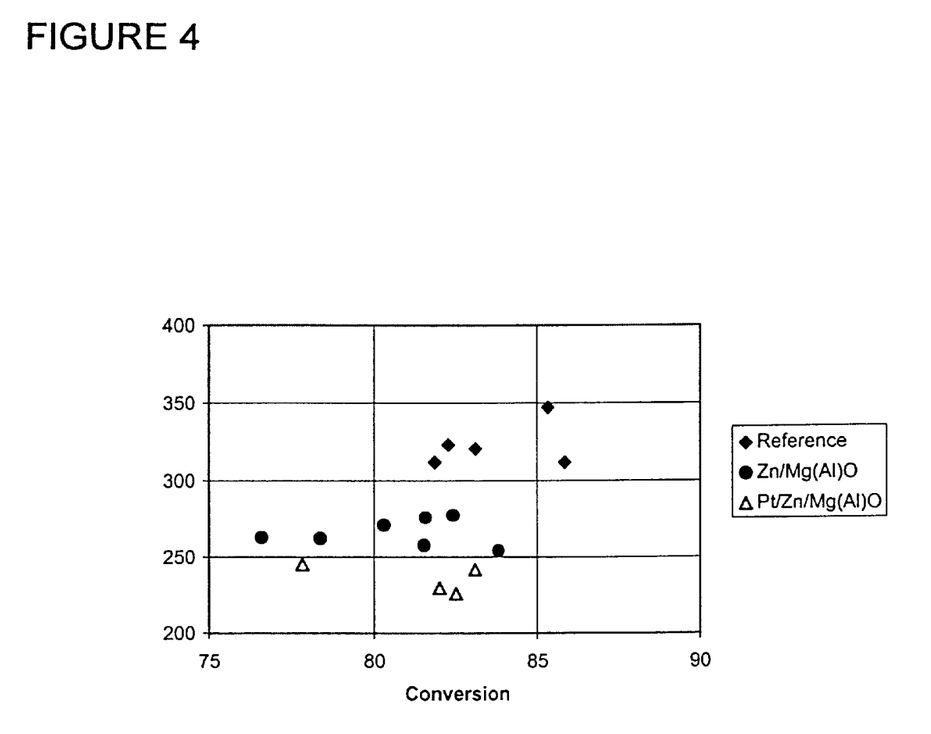
FIG. 4: Effect of $Pt/Zn/Mg(Al)O$ on the sulphur content in FCC-naphtha.

The result of this test were compared with the results of Example 2, which is given in FIG. 4. it appears from the Figure that the Pt-promoted composition possesses of somewhat greater capacity for reducing the sulphur content than corresponding composition without Pt.

EXAMPLE 5

Each single sulphur component is detected by AED. The Table 1 gives percentage reduction of the different sulphur compounds which is created in the naphtha fraction by catalytic cracking compared to the reference catalyst (FCC-catalyst without addition of other components). The results of Zn/Mg(Al)O is given from the test described in Example 2, while the results of Pt/Zn/Mg(Al)O is given from the test described in Example 4.

Table 1 interpolates the data of the Figures and compares them at constant conversion (80%).

| Compounds including sulphur | % Reducing Zn/Mg(Al)O | Pt/Zn/Mg(Al)O |
| --- | --- | --- |
| Mercaptans | 89 | 82 |
| Thiophenes | 33 | 26 |
| C$_1$-thiophenes | 21 | 11 |
| C$_2$-thiophenes | 14 | 17 |
| C$_3$-thiophenes/thiophenes | 23 | 24 |
| C$_4$-thiophenes/C$_1$-thiophenols | 90 | 21 |
| Tetrahydrothiophene | 21 | 43 |
| Benzothiophene | −12 | 23 |
| Total content of sulphur in FCC-naphtha | 17 | 26 |
| Total content of sulphur in FCC-naphtha minus benzothiophene | 34 | 28 |

TABLE 2 gives the results of the MAT-experiments of the composition of Zn/Mg(Al)O (Example 2), third column.

| Compounds including sulphur | Reference | Zn/Mg(Al)O (Example 2) |
| --- | --- | --- |
| Mercaptans | 22 | 2 |
| Thiophene | 40 | 28 |
| C$_1$-thiophenes | 62 | 49 |
| C$_2$-thiophenes | 40 | 34 |
| C$_3$-thiophenes/thiophenols | 17 | 13 |
| C$_4$-thiophenes/C$_1$-thiophenols | 7 | 1 |
| Tetrahydrothiophene | 8 | 6 |
| Benzothiophene | 118 | 132 |
| Total content of sulphur in FCC-naphtha | 313 | 266 |

EXAMPLE 6

The analysis of the sulphur content in LCO- and HCO-fraction of the test described in Example 4 was also carried out. The results of this analysis are given in FIGS. 5 and 6. The sulphur content of these fractions was also reduced, as given in the Figures.

What is claimed is:
1. Method for reduction of the content of organically bound sulphur in a hydrocarbon composition in a cracking process, wherein said hydrocarbon composition is contacted with a composition comprising a hydrotalcite material which has been impregnated with a Lewis acid, and which has been promoted with a hydrogen transfer promoter, and an FCC-catalyst.

2. Method according to claim 1, wherein the hydrotalcite material impregnated with the Lewis acid is a separate component in said composition.

3. Method according to claim 1, wherein said hydrotalcite material impregnated with the Lewis acid is incorporated in a matrix of the FCC-catalyst.

4. Method according to claim 1, wherein said Lewis acid is selected from the group consisting of elements and compounds of the transition metals.

5. Method according to claim 4, wherein said Lewis acid is selected from the group consisting of Zn, Cu, Ni, Co, Fe and Mn.

6. Method according to claim 5, wherein said Lewis acid is Zn.

7. Method according to claim 1, wherein said hydrogen transfer promoter is made of Pt.

8. Method according to claim 1, wherein the hydrocarbon composition is selected from the group consisting of FCC-naphtha, LCO fractions, HCO-fractions, and mixtures thereof.

9. Composition for reduction of the content of organically bound sulphur in a hydrocarbon composition, wherein said composition comprises a hydrotalcite material which has been impregnated with a Lewis acid, and which has been promoted with a hydrogen transfer promoter, and, optionally, an FCC-catalyst.

10. Composition according to claim 9, wherein the hydrotalcite material impregnated with the Lewis acid is a separate component in said composition.

11. Composition according to claim 9, wherein the hydrotalcite material impregnated with the Lewis acid is incorporated in a matrix of the FCC-catalyst.

12. Composition according to claim 9, wherein said Lewis acid is selected from the group comprising elements and compounds of the transition metals.

13. Composition according to claim 12, wherein said Lewis acid is selected from the group consisting of Zn, Cu, Ni, Co, Fe and Mn.

14. Composition according to claim 13, wherein said Lewis acid is Zn.

15. Composition according to claim 9, wherein said hydrogen transfer promoter is made of Pt.

* * * * *